Nov. 7, 1967     E. H. LAND     3,351,466
RADIOGRAPHS VIEWABLE BY REFLECTED OR TRANSMITTED LIGHT
Filed July 8, 1963     2 Sheets-Sheet 1

INVENTOR.
Edwin H. Land
BY Brown and Mikulka
and
Alvin Isaacs
ATTORNEYS

Nov. 7, 1967   E. H. LAND   3,351,466
RADIOGRAPHS VIEWABLE BY REFLECTED OR TRANSMITTED LIGHT
Filed July 8, 1963   2 Sheets-Sheet 2
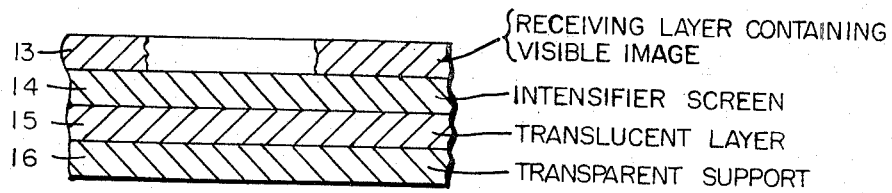
FIG. 4
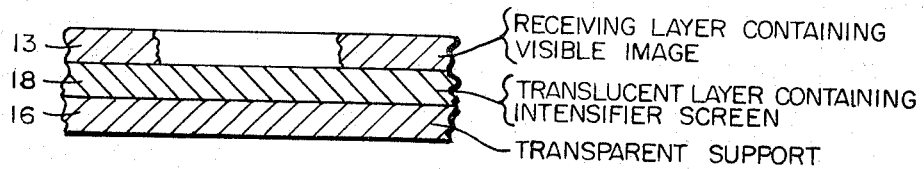
FIG. 5
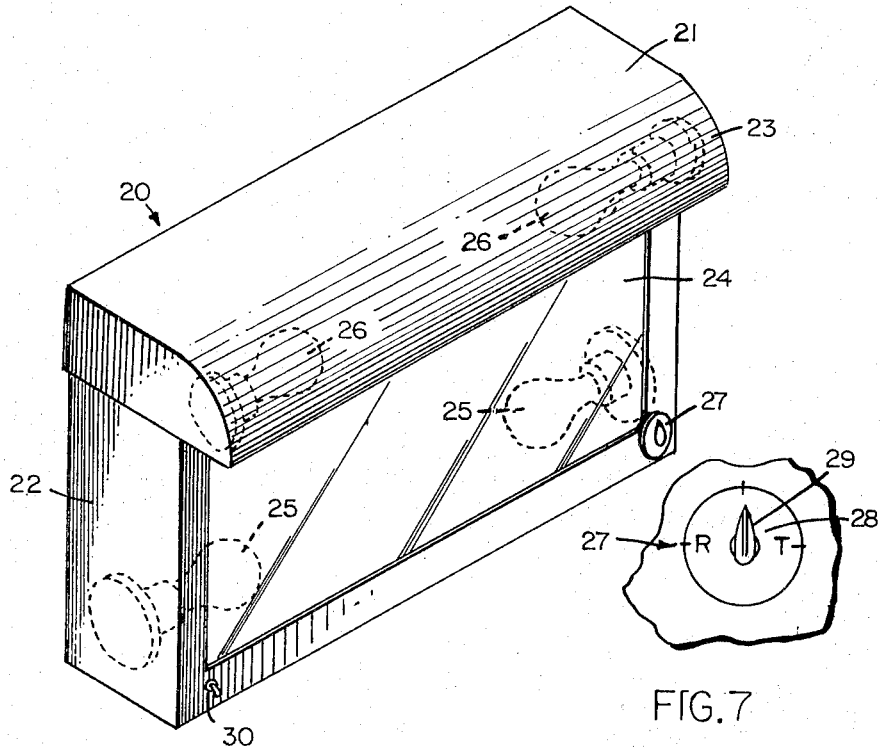
FIG. 6
FIG. 7
INVENTOR.
Edwin H. Land
BY Brown and Mikulka
and
Alvin Isaacs
ATTORNEYS

United States Patent Office 3,351,466
Patented Nov. 7, 1967

3,351,466
RADIOGRAPHS VIEWABLE BY REFLECTED OR TRANSMITTED LIGHT
Edwin H. Land, Cambridge, Mass., assignor to Polaroid Corporation, Cambridge, Mass., a corporation of Delaware
Filed July 8, 1963, Ser. No. 293,326
The portion of the term of the patent subsequent to May 25, 1982, has been disclaimed
6 Claims. (Cl. 96—29)

This application is a continuation-in-part of copending application Ser. No. 113,275, filed May 29, 1961, now U.S. Patent No. 3,185,841.

This invention relates to radiography and more particularly to novel film units and processes for preparing radiographs.

It has heretofore been known in the field of radiography to employ intensifier screens, e.g., screens which emit phosphors or visible light when excited by X-rays or other penetrating, ionizing radiation, primarily for the purpose of reducing the amount of exposure to radiation necessary to form a radiographic image of a given density. Use of such screens also gives a more desirable, i.e., longer contrast range curve.

Copending application Ser. No. 113,275, filed May 29, 1961, in the name of Edwin H. Land (now U.S. Patent No. 3,185,841) discloses and claims the novel concept of providing an intensifier screen as an integral part of the image-receiving element, as distinguished from prior practices where the intensifier screen is not an integral part of the image, but is either destroyed subsequent to exposure or employed in the preparation of subsequent radiographs. This results in several advantages not heretofore obtainable. Where the intensifier screen is an integral part of the photographic product, it acts as a "built-in" diffusing device which when excited by the viewing light emits visible light, thereby providing greater brilliance and contrast than would ordinarily be obtainable. Moreover, such a film structure makes it possible to obtain a sharper image due to the fact that the intensifier screen is uniformly optically closer to the emulsion layer than in prior art processes, thus minimizing distortion in the radiograph. These and other advantages are pointed out with more particularity in the parent application.

The present application is a continuation-in-part of the aforementioned copending application and relates primarily to the preparation of radiographs which may be viewed either by reflected light or by transmitted light or by a combination of both reflected and transmitted light.

One object of this invention therefore is to provide a novel film unit capable of being used in diffusion transfer processes to prepare a radiographic image which may be viewed either as a transparency or as a reflection print.

Another object is to provide a novel process for preparing radiographs which may be viewed either as a transparency or as a reflection print.

Yet another object is to provide a novel radiograph of the foregoing description.

Still another object is to provide a novel system for viewing radiographs.

Other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a diagrammatic, enlarged, cross-sectional view of the visible image obtained by separating, at some time subsequent to development, the receiving layer containing the radiograph from the emulsion layer of the film assembly shown in FIGS. 1 or 2;

FIG. 5 is a view similar to FIG. 4, showing the visible image obtained from the film assembly of FIG. 3;

FIG. 6 is a perspective view of a device useful in viewing radiographs prepared in accordance with this invention; and FIG. 7 is an enlarged view of a portion of the viewing device of FIG. 6.

Generally speaking, photographic images, including radiographs, may be classified as being either reflection prints or transparencies. Reflection prints ordinarily have a substantially opaque backing and are viewed by reflected or incident light; whereas transparencies have a substantially transparent backing and are viewed by transmitted light, e.g., by light passing through the transparent or non-image areas of the print. Each of the foregoing types of photographic images affords advantages to the viewer not ordinarily obtainable by the other. For example, generally speaking, reflection prints are more convenient since they do not require special sources of light and/or positioning of the print in front of a suitable light source (as would be true of transparencies). Transparencies, on the other hand, generally afford greater detail to the viewer due to the greater brilliance and longer scale obtainable when viewing by transmitted light.

In the field of radiography, a reflection print has obvious utility since it permits the radiologist or other practitioners to obtain most, if not all, of the desired information at a glance without having to resort to the special viewing equipment normally required to view transparencies. However, many practitioners desiring more detailed observation of the radiograph, prefer transparencies which may be placed against a viewing device and viewed by light transmitted from a strong source of light contained therein. Moreover, it has been found that certain information obtainable from a radiograph is more readily visible when viewed as a transparency, whereas other information obtainable from the same radiograph may be more readily visible when viewed as a reflection print.

From the foregoing brief discussion, it should be apparent that it would be extremely desirable in the field of medicine, as well as in other fields where radiographs are employed, to obtain a radiograph which is neither a reflection print alone nor a transparency alone, but may be viewed either as a reflection print or as a transparency, thereby combining the advantages of both in a single radiograph.

This objective is accomplished by a modification of the invention described and claimed in the aforementioned parent application. The invention will be more readily understood by reference to the illustrative drawings.

Figure 1:
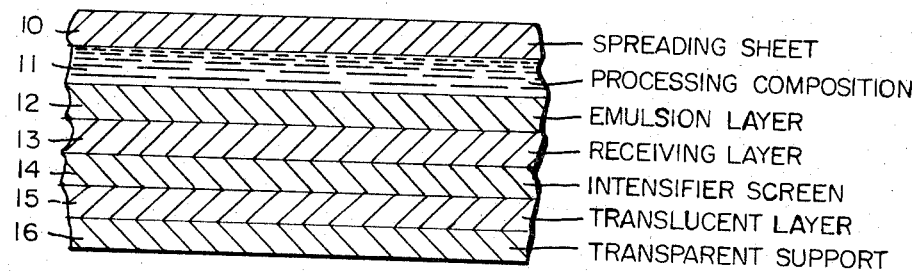
FIGURE 1 is a diagrammatic, enlarged, cross-sectional view showing one embodiment of the novel product of this invention during one stage of development, the thickness of the various materials being greatly exaggerated for purposes of illustration.

In the embodiment illustrated in FIGURE 1, there is provided a film structure comprising, in order, a transparent support 16, a layer of a translucent material 15, an intensifier screen 14, an image-receiving layer 13, and a photosensitive emulsion layer 12. Intensifier screen 14 is preferably but not necessarily laminated to receiving layer 13, and receiving layer 13 is, in turn, preferably but not necessarily laminated to emulsion layer 12.

Support 16 may comprise any of the transparent base materials heretofore employed in the art for such purposes and may for example be a plastic such as a cellulosic ester, e.g., cellulose acetate, a synthetic superpolymer of the nylon type, etc.

The translucent material in layer 15 may comprise a suitable pigment such as finely divided titanium dioxide, calcium carbonate, magnesium oxide, barium sulfate, etc.

While support 16 has been described for purposes of illustration as being transparent, it will be appreciated that the support may itself be translucent, e.g., pigmented polystyrene or diacetate, etc., in which case translucent layer 15 may be eliminated.

Intensifier screen 14 may be any of the intensifier screens heretofore known in the art and may comprise, for example, a layer of barium sulfate/lead sulfate mixed phosphor dispersed in a chlorosulfonated polyethylene prepared in the manner described in U.S. Patent No. 2,877,379.

Image-receiving layer 13 may be any of those heretofore used in photographic diffusion transfer processes, e.g., silver-receptive stratums containing at least one silver precipitating agent, such as the image-receiving layers disclosed in U.S. Patents Nos. 2,698,237, 2,690,238, 2,698,245, 2,774,667 and 2,823,122. In a preferred embodiment, image-receiving layer 13 comprises an image-receiving layer containing deacetylated chitin, which is described and claimed in the copending U. S. application of William H. Ryan et al., Ser. No. 808,123, filed Apr. 22, 1959.

Emulsion layer 12 may be any suitable photosensitive emulsion such as the silver halide emulsions described in U.S. Patents Nos. 2,565,378 and 2,887,379. Obviously, light-sensitive materials other than silver halide, and processing compositions for developing the same may be employed. It will also be appreciated that, in lieu of systems predicated upon the transfer of unexposed silver halide to form a silver image, systems utilizing the transfer of dyes, color couplers, or other color image-forming constituents to provide a color radiograph are within the scope of this invention.

Where desired, a stripping layer may be positioned between emulsion layer 12 and image-receiving layer 13 to facilitate separation of these layers. Materials suitable for use as stripping layers are well known in the art.

The film structure described above may be employed in diffusion transfer processes heretofore known in the art such as for example the processes for preparing positive radiographs described in the aforementioned U.S. Patent No. 2,565,378.

As will be appreciated by those skilled in the art, X-rays or other penetrating ionizing radiation pass through support 16 and layer 15 and impinge upon screen 14, causing it to emit phosphorescent or visible light, the combined actinic radiation thereby exposing the photosensitive emulsion layer 12. At some time subsequent to exposure, emulsion layer 12 is contacted with a processing composition 11, preferably as a relatively viscous layer. To insure uniform application of the processing composition, a spreading sheet 10 may be provided.

The layer of liquid processing composition 11 may be obtained, for example, by spreading in the manner disclosed in U.S. Patent No. 2,698,244, issued Dec. 28, 1954, to Edwin H. Land. As disclosed in that patent, the liquid processing composition may be disposed in a rupturable container so positioned with respect to the emulsion, that upon compression by passing between a pair of suitably gapped rollers, a substantially uniform layer 11 of processing composition is distributed between the surfaces of emulsion layer 12 and spreading sheet 10. While the above-mentioned means of application is particularly useful in a continuous processing operation, the liquid processing composition may be applied in other manners, such as by immersing, spraying, flowing, etc. in the dark.

The processing composition may be a film-forming processing composition such as those disclosed in the aforementioned U.S. Patents Nos. 2,543,181 and 2,565,378. It may comprise, for example, a developing agent such as hydroquinone, an alkali such as sodium hydroxide, a silver halide complexing agent such as sodium thiosulfate, and a high molecular weight film-forming thickening agent such as hydroxyethyl cellulose or sodium carboxymethyl cellulose. Various other additives such as accelerating developing agents, preservatives, antifogging agents, and the like may also be employed. All of these materials are preferably in aqueous solution. These photographic agents are preferably contained in solution in the processing liquid prior to the spreading thereof as layer 11, but they may be in part or wholly dissolved into the processing composition as it is spread upon emulsion layer 12.

Where a usable full density negative image is desired as well as the positive transfer image, use may be made of processing compositions such as are described and claimed in copending application Ser. No. 94,451, filed Mar. 9, 1961, in the names of Edwin H. Land, Meroe M. Morse and Elizabeth L. Yankowski.

As a substantially uniform distribution of processing composition 11 is distributed on the external surface of silver halide emulsion layer 12, the reagents of the composition permeate the photosensitive emulsion, thereby developing the latent image contained therein according to the point-to-point degree of exposure of the emulsion. Substantially contemporaneously with the development of the latent image, an imagewise distribution of soluble silver complex is formed from the unexposed silver halide within the emulsion. At least part of this soluble silver complex is transferred, by imbibition, to the image-receiving layer 13. The transferred silver complex is reacted in known manner to provide a positive, reversed image of the latent image.

At some time subsequent to the formation of the positive image, the image-receiving layer 13 may be stripped from the emulsion to reveal the positive image.

Figure 2:
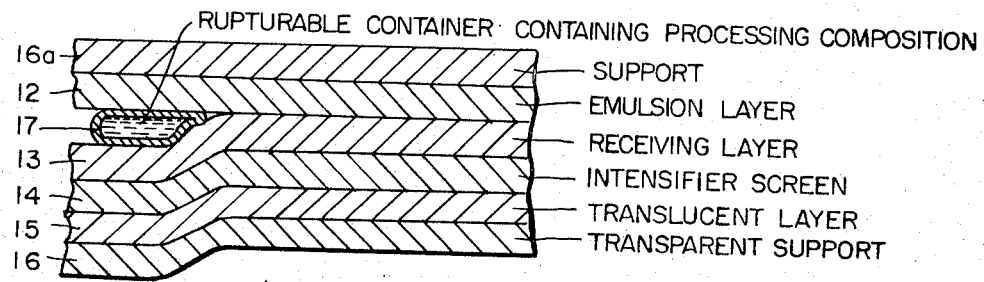
FIG. 2 is a similar view of another embodiment of this invention prior to application of the processing fluid.

FIG. 2 illustrates another embodiment of the invention. As shown in FIG. 2, a rupturable container 17 confining the processing solution, such as that disclosed in U.S. Patent No. 2,565,378, is provided between emulsion layer 12 and receiving layer 13. A suitable support 16a, which may be the same as support 16 or may be opaque, is provided for the emulsion layer. The radiographic product illustrated in FIG. 2 is utilized in a diffusion transfer process very similar to that previously described. At some time subsequent to exposure, rupturable container 17 is broken, as by passage through a pair of pressure rollers, and the processing composition confined therein is thereby spread in a substantially uniform layer between the emulsion layer and the receiving layer. A positive image is thus obtained by the transfer, by imbibition, of an imagewise distribution of soluble silver complex formed from unexposed silver halide. This positive image may also be revealed by stripping the image-receiving layer from the emulsion.

In a variation of the film structure illustrated in FIG. 2, emulsion layer 12 and receiving layer 13 are laminated together, as by a stripping layer, and rupturable container 17 is located exterior to the two laminated layers at one edge thereof, rather than between them such as shown in FIG. 2. By eliminating the air space between the emulsion layer and the image-receiving layer, substantial increases in image resolution are obtained. In such an arrangement, the rupturable container is provided with a discharge mouth connected to the elements in a fluid-tight manner so that hydraulic pressure generated upon compression of the container tends to force the fluid between laminae of the film assemblage and to force the laminae apart, rupturing the bond therebetween. Photographic products of this nature are disclosed in U.S. Patent No. 3,053,659, issued to Edwin H. Land. In a particularly useful variation of this embodiment, a white reflecting layer, e.g., baryta, is coated between the support 16a and the emulsion layer 12. This white layer contributes to the total film speed by its reflecting action.

In the embodiments of the invention heretofore described and illustrated in FIGS. 1 and 2, the intensifier screen and the layer of translucent material have been in separate layers. In the embodiment illustrated in FIG. 3, a single layer 18 is provided comprising a translucent layer containing the intensifier screen. This may be accomplished in one of two ways. The translucent material may be dispersed substantially uniformly throughout the layer containing the intensifier screen, or alternatively, the materials employed for preparing the intensifier screen may themselves be translucent, thereby performing the dual function of providing an intensifier screen and a translucent layer. As an example of useful translucent intensifier screens, mention may be made of what is known in the art as a "P–4 phosphor screen," i.e., an intensifier screen made of a mixture of silver-activated zinc sulfide and silver-activated zinc cadmium sulfide.

FIG. 4 illustrates the structure of the visible positive radiograph prepared in FIGS. 1 or 2 after it is stripped from the emulsion layer.

Figure 3:
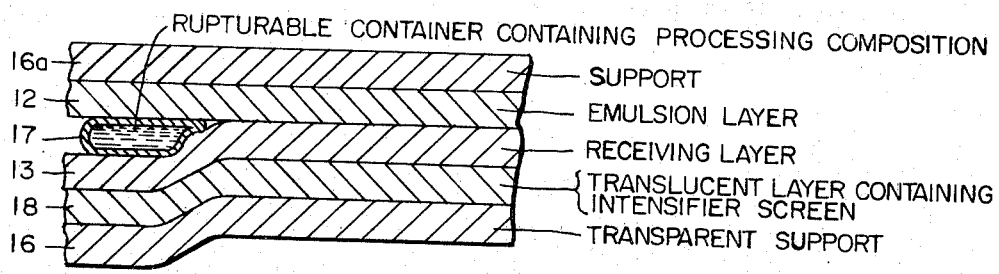
FIG. 3 is a similar view of yet another embodiment of this invention.

FIG. 5 illustrates the structure of the visible positive radiograph prepared from the embodiment illustrated in FIG. 3 after it is stripped from the emulsion layer.

From the foregoing description, it should be apparent that the radiographs prepared by diffusion transfer by the present invention all contain as an integral part thereof an intensifier screen and a layer containing a translucent material. In the embodiments providing the radiograph illustrated by FIG. 4, the intensifier screen and the translucent material are in separate layers; whereas in the embodiment providing the radiograph illustrated by FIG. 5, the intensifier screen and the translucent material are in the same layer. As we mentioned heretofore, in the latter embodiment the intensifier screen may itself comprise the translucent material.

The intensifier screen provides the advantages heretofore mentioned and described in the parent application, Ser. No. 113,275.

In addition, because of the presence of the layer of translucent material, the radiograph may be viewed by either reflected or transmitted light, or by a combination of both. In other words, because of the opacity and ability to reflect light, the translucent material permits the radiograph to be viewed as a reflection print. On the other hand, sufficient light is transmitted through the translucent material when transilluminated to permit the radiograph to be viewed as a transparency.

The present invention therefore provides a radiograph of excellent density and contrast, affording to the practitioner a radiograph which is both a reflection print and a transparency, thereby combining the advantages of both types of photographic images into a single radiograph.

While the radiograph of this invention is adaptable to viewing by any source of reflected or transmitted light, a viewing device such as illustrated in FIGS. 6 and 7 has been found to be particularly satisfactory.

As shown in FIG. 6, viewing device 20 has a top 21 and side walls 22 which are preferably opaque and a front surface 24 made of frosted glass or the like which permits transmission of light from a strong source 25 located within, e.g., behind light-transmitting surface 24. A shield 23 extending away from the front of the viewer and having a strong light source 26 mounted thereon in a position adaptable to illuminate the front of the viewer is also provided. The internal surface of shield 23 is preferably mirrored so as to provide a reflecting surface to increase the intensity of light cast upon the front of the viewer. While light sources 25 and 26 are shown each to be a pair of incandescent lights, obviously other light sources and/or numbers of lights may be employed.

Both light sources 25 and 26 are wired by a series of switches (not shown) to a control 27 in such a manner that the intensity of light emitted from lights 25 and/or 26 may be controlled. As shown in FIG. 7, control 27 includes a dial 28 provided with an indicator 29. Suitable marking indica such as the R, T and intermediate point therebetween shown in FIG. 7 are preferably provided on the face of the control. An on-off switch 30 is also provided.

The radiograph of this invention, e.g., the radiograph shown in FIG. 4 or 5, is placed against the front surface 24 and the viewing device is turned on by moving switch 30. The desired viewing light is obtained by turning dial 28 in the desired position. When indicator 29 is turned all the way to the left so that it points to the "R" on the dial, only light source 26 is on and the radiograph is viewed solely by reflected light. As the dial is turned to the right, the intensity of light from source 26 decreases and source 25 is turned on and slowly increases in intensity. In other words, when indicator 29 is turned all the way to the left, source 25 is off and a full intensity of light is emitted from source 26, and when the indicator is then moved to the right, both sources of light are on, the intensity of light from source 26 decreasing and the intensity of light from source 25 increasing as the dial is turned further to the right. At intermediate positions on the dial, it should be apparent that the radiograph may then be viewed by both reflected and transmitted light. At a point equidistant on the dial, e.g., when the indicator points straight up, the intensity of light emitted from the two sources is approximately equal. When the dial is turned all the way to the right, so that the indicator points to the "T," a full intensity of light is emitted from source 25 and source 26 is turned off, so that the radiograph is viewed solely as a transparency.

It will be appreciated that various changes may be made in the film structures illustrated in FIGS. 1–5 without departing from the scope of the invention. For example, where the film unit is of sufficient strength, support 16 may be eliminated. Other changes will be apparent to those skilled in the art.

It is also contemplated that where found desirable or expedient to do so, the intensifier screen and the advantages resulting therefrom may be dispensed with. The transfer image, whether positive or negative, obtained from such a film structure may still be viewed as a transparency or as a reflection print.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A photographic product comprising a transparent support having on one side thereof, in sequence, a layer of a translucent material adjacent said support, an X-ray intensifier screen above said layer of translucent material, an image-receiving layer above said intensifier screen, and a photosensitive emulsion layer above said image-receiving layer.

2. A photographic product as defined in claim 1 including a photographic processing composition and a spreading sheet for said processing composition.

3. A photographic product comprising a transparent support having on one side thereof, in sequence, a layer of a translucent material adjacent said support, an X-ray intensifier screen above said layer of translucent material, an image-receiving layer above said intensifier screen, a photosensitive emulsion layer above said image-receiving layer, and a rupturable container confining a photographic processing composition, said container being so positioned so as to be capable, upon rupturing, of spreading said processing composition in a substantially uniform layer between said emulsion layer and said image-receiving layer.

4. A process for preparing radiographs which comprises: (1) providing an integral film assembly comprising, in order, a transparent support, a translucent material and an intensifier screen in a layer above said support, an image-receiving layer above said intensifier screen and a photosensitive silver halide emulsion layer above said image-receiving layer; (2) exposing said film assembly through said support to radioactive rays; (3) developing said exposed emulsion; and (4) forming a positive silver image by transferring, by imbibition, an imagewise distribution of unexposed silver halide to said image-receiving layer, thereby forming a positive radiograph which is both a reflection print and a transparency.

5. The process as defined in claim 4 including the steps of separating the image-receiving layer containing the positive image from the emulsion layer and viewing said positive image by both reflected and transmitted light.

6. A translucent radiograph comprising a transparent support having on one side thereof, in sequence, a layer of a translucent material adjacent to said support, an X-ray intensifier screen above said layer of translucent material, and a layer containing a radiographic image above said intensifier screen, said radiographic image being viewable by both transmitted and reflected light.

References Cited
UNITED STATES PATENTS

| | | | |
|---|---|---|---|
| 804,039 | 11/1905 | Pifer | 96—79 |
| 3,053,659 | 9/1962 | Land | 96—29 |
| 3,163,554 | 12/1964 | Gessler | 96—2 |
| 3,185,841 | 5/1965 | Land | 96—76 |

NORMAN G. TORCHIN, *Primary Examiner.*

J. TRAVIS BROWN, *Examiner.*